H. W. HANCOCK.
AIR PUMP OR COMPRESSOR.
APPLICATION FILED MAY 11, 1914.
1,160,166.
Patented Nov. 16, 1915.
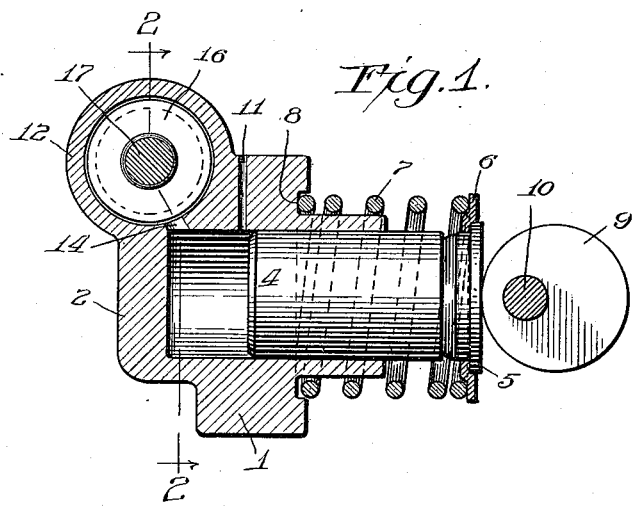
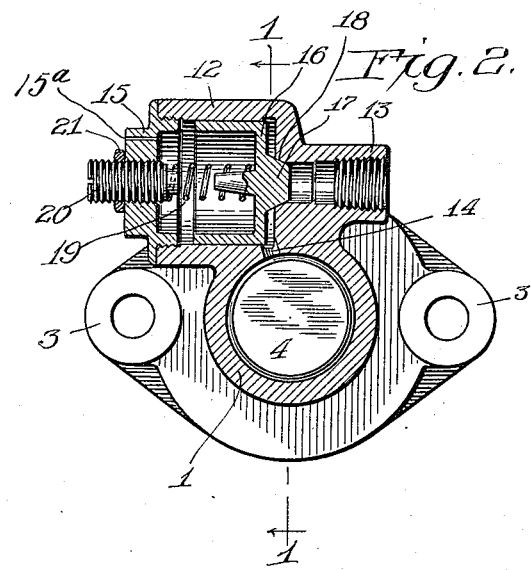
Witnesses:
A. S. Gaither
W. G. Heilman
Inventor:
Harry W. Hancock.
By Miller & Chindahl
Atty.

UNITED STATES PATENT OFFICE.

HARRY W. HANCOCK, OF CHARLOTTE, MICHIGAN.

AIR PUMP OR COMPRESSOR.

1,160,166.  Specification of Letters Patent.  Patented Nov. 16, 1915.

Application filed May 11, 1914. Serial No. 837,627.

*To all whom it may concern:*

Be it known that I, HARRY W. HANCOCK, a citizen of the United States, residing at Charlotte, in the county of Eaton and State of Michigan, have invented certain new and useful Improvements in Air Pumps or Compressors, of which the following is a specification.

The invention is herein shown as embodied in an air pump especially adapted for use upon automobiles and similar vehicles for supplying air under relatively low pressure to the gasolene tank. Such air pumps must be as small, light, and simple as possible, and it is an object of this invention to produce an air pump fulfilling these requirements.

Air pumps of the class mentioned are driven by the engine and operate continuously while the engine is running. Means, therefore, must be provided for preventing the pressure in the gasolene tank from rising above the desired point. In previous constructions, this result has been obtained by providing a special relief or unloading valve.

One of the objects of this invention is to provide a single valve which will serve not only as a check valve for the pump, but as a relief or unloading valve for the tank containing the pressure fluid.

In the accompanying drawings, Figures 1 and 2 are sectional views of an air pump embodying the features of my invention, the views being taken upon the planes indicated by the dotted lines.

The present embodiment of my invention comprises a cylinder 1 having a head 2 cast integral therewith, said cylinder being provided with attaching flanges 3, by means of which the pump may be mounted upon a suitable part of the automobile engine or other portion of the automobile. A piston 4 is slidably mounted in the cylinder 1, and has an annular flange 5 at its outer end. A collar 6 bears against the flange 5 and furnishes an abutment for a coiled compression spring 7 which surrounds a portion of the cylinder 1, the other end of said spring being seated in a groove 8 in the pump body. The spring 7 tends to move the piston 4 outwardly. The piston is moved in the opposite direction by suitable means such as an eccentric 9 mounted upon a shaft 10 which is driven by the engine, said eccentric bearing against the outer end of the piston. Air is supplied to the cylinder through a suitable number of ports 11.

12 indicates a cylinder or chamber formed integral with or otherwise suitably connected to the cylinder 1.

13 is a threaded nipple, the bore of which communicates with one end of the cylinder 12. To the nipple 13 may be connected a tube extending to the gasolene tank or other reservoir in which air under pressure is to be stored. The end of the cylinder 12 which communicates with the nipple 13, also communicates with the inner end of the cylinder 1 through a port 14. The opposite end of the cylinder 12 may be closed in any suitable way, as for example, by means of a head 15 having a screw-thread connection with the cylinder 12. Within the cylinder 12 is slidingly mounted a piston 16 which is provided with a valve member 17, said valve member preferably having a tapered surface adapted to fit upon a correspondingly tapered valve seat 18, which surrounds the inner end of the bore of the nipple 13. A coiled spring 19 bears at one end against the piston 16 and at its other end against an adjusting screw 20, the latter being mounted in the cylinder head 15.

21 is a lock-nut. The spring 19 tends to hold the valve member 17 seated.

In operation, the piston 4 is reciprocated, air entering through the port 11 and being forced through the port 14 into the space between the piston 16 and the inner head of the cylinder 12. The pressure of the air entering said space is sufficient to force the piston 16 back far enough to unseat the valve member 17 and thus permit the air to flow through the nipple 13 and the before-mentioned tube into the tank. As soon as the air has passed the valve 17, the spring 19 seats said valve member. The operations just described are repeated until the pressure in the tank rises to the predetermined point, that is to say, the point determined by the adjustment of the spring 19. Thereafter, the operation is as follows: When the piston 4 moves outwardly the air pressure in the tank acts upon the valve member 17 to unseat said valve member, thereby allowing air to pass from the tank to the cylinder 1; consequently instead of a fresh supply of air being drawn into the cylinder 1 through the port 11, and compressed, the air previously pumped will flow back and forth. It will thus be seen that the piston valve 16 with its valve member 17 acts not only as a check valve for the pump, but as a regulating or relief valve for the tank.

If desired, the piston 16 may have a moderately loose fit in the cylinder 12, so that a very slight leakage of air shall be possible. This is desirable in order that abnormal pressure in the gasolene tank may be relieved. In practice, the gasolene tank may be filled with relatively cool gasolene drawn from an underground tank. If the temperature of the gasolene and consequently its pressure should rise by reason of the fact that the car is left standing in the sun, the pressure in the tank will unseat the valve member 17 and the excess pressure will leak past the piston 16.

It will be evident that the construction herein shown provides a small, compact and simple construction especially adapted to the handling of small volumes of air at low pressure.

I claim as my invention:

1. An air pump or compressor comprising a pump cylinder and piston, a valve cylinder, one end of which communicates with the pump cylinder, said end of the valve cylinder having an outlet, a piston in the valve cylinder, a valve member on the second mentioned piston adapted to close said outlet, and means acting on the second mentioned piston and tending to hold the valve member in closed position.

2. An air pump or compressor comprising a pump cylinder and piston, a valve cylinder having a head, said head having an outlet, a piston in said valve cylinder, the space between said last mentioned piston and head being in constant communication with the pump cylinder, said last mentioned piston having a valve member adapted to close said outlet, and an adjustably-supported spring acting upon said last mentioned piston and tending to hold the valve member seated.

3. An air pump or compressor comprising a pump cylinder and piston, a valve cylinder communicating with the pump cylinder, said valve cylinder having a head, a discharge nipple having a bore communicating with said head, a piston in said valve cylinder, said last mentioned piston having a valve member adapted to close said bore, said valve member being arranged to be unseated by pressure in the pump cylinder and the discharge nipple, and an adjustably-supported spring acting upon said piston and tending to hold the valve member seated.

4. An air pump or compressor comprising a pump cylinder and piston, a valve cylinder communicating with the pump cylinder, said valve cylinder having a head, a discharge nipple having a bore communicating with said head, a valve seat being formed on said head surrounding the inner end of said bore, a piston in said valve cylinder, said last mentioned piston having a valve member adapted to be seated on said valve seat, and an adjustably-supported spring acting upon said last mentioned piston and tending to hold the valve member seated.

5. An air pump or compressor comprising a pump cylinder and a piston, and having a passage arranged to communicate with a receiver, and a check valve arranged to close said passage and arranged to be opened by pressure in said passage and by pressure in the pump cylinder.

6. An air pump or compressor comprising a pump cylinder and piston, a chamber one end of which communicates with the pump cylinder, said end of the chamber having an outlet, a valve member in the chamber adapted to close said outlet, and means tending to hold the valve member in closed position.

In testimony whereof, I hereunto set my hand in the presence of two witnesses.

HARRY W. HANCOCK.

In the presence of—
K. H. CONLEY,
F. MERLE HARRINGTON.

Copies of this patent may be obtained for five cents each, by addressing the "Commissioner of Patents, Washington, D. C."